(12) United States Patent
Stachniuk

(10) Patent No.: US 9,676,166 B1
(45) Date of Patent: Jun. 13, 2017

(54) MODULAR REINFORCED INSULATING CONCRETE FORM

(71) Applicant: Waldemar Stachniuk, Citrus Heights, CA (US)

(72) Inventor: Waldemar Stachniuk, Citrus Heights, CA (US)

(*) Notice: Subject to any disclaimer, the term of this patent is extended or adjusted under 35 U.S.C. 154(b) by 0 days.

(21) Appl. No.: 14/976,227

(22) Filed: Dec. 21, 2015

Related U.S. Application Data

(60) Provisional application No. 62/096,069, filed on Dec. 23, 2014.

(51) Int. Cl.
| | |
|---|---|
| *B32B 7/02* | (2006.01) |
| *B32B 27/06* | (2006.01) |
| *E04B 2/86* | (2006.01) |
| *E04G 11/06* | (2006.01) |

(52) U.S. Cl.
CPC ............... *B32B 7/02* (2013.01); *B32B 27/06* (2013.01); *E04B 2/86* (2013.01); *E04G 2011/067* (2013.01)

(58) Field of Classification Search
CPC ........ E04B 2/86; E04B 2/8605; E04B 2/8611; E04B 2/8617; E04C 1/40; E04C 1/41; E04G 2011/067; B32B 5/18; B32B 7/02; B32B 13/045; B32B 27/065; B32B 27/06
USPC ............................................. 428/158; 52/426
See application file for complete search history.

(56) References Cited

U.S. PATENT DOCUMENTS

| | | | | |
|---|---|---|---|---|
| 959,629 A | * | 5/1910 | Sleeper | 52/426 |
| 1,071,467 A | * | 8/1913 | Savage | E04B 5/40 52/250 |
| 1,442,589 A | * | 1/1923 | Whitall | E04B 2/8635 52/426 |
| 1,616,977 A | * | 2/1927 | Koivu | E04B 2/8652 52/426 |
| 3,992,844 A | * | 11/1976 | Gretter | E04B 2/68 52/424 |
| 4,094,110 A | * | 6/1978 | Dickens | E04B 1/166 52/417 |
| 4,750,308 A | * | 6/1988 | McKay | E04B 2/8641 24/DIG. 32 |
| 5,086,600 A | * | 2/1992 | Holland | E04B 2/26 52/309.12 |
| 5,568,710 A | * | 10/1996 | Smith | E04B 2/40 52/309.11 |
| 5,771,648 A | * | 6/1998 | Miller | E04B 2/8647 52/309.12 |

(Continued)

*Primary Examiner* — Michael Safavi
(74) *Attorney, Agent, or Firm* — Spano Law Group; Joseph S. Spano

(57) ABSTRACT

Modular, prefabricated insulating concrete forms and methods for fabricating such forms are presented herein. In one aspect, a reinforced cement based coating is disposed over at least the top, bottom, and outward facing surfaces of insulating foam cores comprising two sidewalls of a modular, prefabricated insulating concrete form (ICF). In a further aspect, a cement based finish coating is disposed over a portion of the reinforced cement based coating located over an outward facing surface of a sidewall of the ICF. In another aspect, at least a portion of the top and bottom surfaces of the sidewalls are disposed at an angle with respect to the outward facing surfaces of the sidewalls such that the sloped portions of the bottom and top surfaces are parallel. In this manner, multiple ICFs interlock when stacked on top of one another.

24 Claims, 5 Drawing Sheets

(56) References Cited

U.S. PATENT DOCUMENTS

| | | | | |
|---|---|---|---|---|
| 7,681,368 | B1* | 3/2010 | Rubio | E04C 2/044 |
| | | | | 256/31 |
| 2001/0032431 | A1* | 10/2001 | Grinhpun | E04B 2/8641 |
| | | | | 52/309.12 |
| 2004/0177580 | A1* | 9/2004 | Tremelling | E04B 2/8617 |
| | | | | 52/426 |
| 2005/0155306 | A1* | 7/2005 | Childres | E04B 2/8617 |
| | | | | 52/426 |
| 2006/0016146 | A1* | 1/2006 | Heath | E04C 2/049 |
| | | | | 52/633 |
| 2007/0094973 | A1* | 5/2007 | Zhu | E04B 1/161 |
| | | | | 52/415 |
| 2007/0107341 | A1* | 5/2007 | Zhu | E04B 1/161 |
| | | | | 52/309.12 |
| 2008/0005991 | A1* | 1/2008 | Meilleur | E04B 2/8635 |
| | | | | 52/426 |
| 2013/0074432 | A1* | 3/2013 | Ciuperca | E04B 1/21 |
| | | | | 52/309.4 |

* cited by examiner

MODULAR REINFORCED INSULATING CONCRETE FORM

CROSS REFERENCE TO RELATED APPLICATIONS

The present application for patent claims priority under 35 U.S.C. §119 from U.S. provisional patent application Ser. No. 62/096,069, entitled "Modular Reinforced Insulating Concrete Form," filed Dec. 23, 2014, the entire subject matter of which is incorporated herein by reference.

TECHNICAL FIELD

The described embodiments relate to concrete forms, and more particularly to insulating concrete forms for the construction of walls.

BACKGROUND INFORMATION

Concrete structures are an integral component of many types of buildings. In some examples, the building foundation includes concrete walls. In some examples, the walls of the building itself are constructed from formed concrete. Many of these structures are formed and poured on the construction site using a variety of forming systems.

In some examples, a system of insulating concrete forms (ICF) is utilized to define the shape of a concrete wall, acting both as a system of formwork for the poured concrete and providing rigid thermal insulation layers that stay in place as a permanent interior and exterior substrate for walls, floors, and roofs. Typically, the forms are interlocking modular units that stacked on-site and filled with concrete. The ICF units lock together using integrally formed interlocking structures, reinforcement hardware, or a combination thereof.

ICF formwork has become commonplace in both commercial and residential construction in response to more energy efficiency mandates and rising labor costs. However, widespread adoption of ICF formwork has been limited by the fragility of the forms themselves. The foam based construction of the ICF modules leaves them vulnerable to job site abuse that may render them unusable, or worse yet, compromise the integrity of a concrete pour.

Existing ICF modules suffer from a lack of structural reliability until concrete cure. Special handling practices should be followed to ensure that the ICF modules retain their integrity from the time they are manufactured until their function as formwork for poured concrete is completed. This increases costs and adds project risk. Thus, improved ICF modules and methods of manufacture are desired.

SUMMARY

Modular, prefabricated insulating concrete forms and methods for fabricating such forms are presented herein.

In one aspect, a reinforced cement based coating is disposed over at least the top, bottom, and outward facing surfaces of an insulating foam core comprising a sidewall of a modular, prefabricated insulating concrete form (ICF). Similarly, a reinforced cement based coating is disposed over at least the top, bottom, and outward facing surfaces of the insulating foam core comprising another sidewall of the modular, prefabricated ICF. In this manner, the prefabricated, modular, ICF includes a robust, durable coating over the surfaces of the ICF that might be subjected to mechanical abuse during shipping and installation at the job site.

In some embodiments, the reinforced cement based coatings on each sidewall are the same material. However, in some other embodiments, the reinforced cement based coatings are different materials. In one embodiment, a reinforced cement based coating applied to one sidewall is a waterproof, reinforced cement based coating that is suitable for application as part of an exterior facing wall of a building. In this embodiment, a reinforced cement based coating that is moisture permeable is applied to the opposite sidewall. Such a coating that is suitable for application as part of an interior facing wall of a building. In this manner, any moisture that might accumulate with a wall constructed from the modular, prefabricated ICFs described herein will be able to vent through the interior facing wall of the building, yet the exterior facing wall of the building will remain waterproof.

In some embodiments, the reinforced cement based coating includes a mesh reinforcement material embedded in the cement based coating. For example, a metal or fiberglass mesh material may be embedded in the cement based coating.

In a further aspect, the front and rear facing surfaces of the sidewalls are also coated with the same reinforced cement based material employed to coat the outward facing surfaces of the sidewalls.

In another aspect, at least a portion of the top surfaces of the sidewalls are disposed at an angle with respect to the outward facing surfaces. Similarly, at least a portion of the bottom surfaces of the sidewalls are disposed at an angle with respect to the outward facing side surfaces sidewalls such that the sloped portions of the bottom surfaces are parallel to the top surfaces. In this manner, copies of ICF 100 stacked on top of one another interlock at the interface of the top and bottom surfaces.

In some embodiments, portions of the front and back surfaces of a modular, prefabricated ICF are also tapered at an angle such that copies of the ICF stacked end-to-end interlock at the interface of the front and rear surfaces. However, in some other embodiments, the front and back surfaces of ICF 100 are not tapered.

In a further aspect, a modular, prefabricated ICF includes a cement based finish coating disposed over a portion of the reinforced cement based coating located over an outward facing surface of a sidewall of the ICF form. In some embodiments, the cement based finish coating does not extend to the edges of outward facing surface of the sidewall. This leaves room for final taping and finishing of the wall after concrete pour with a minimum of material and labor.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Figure 1:
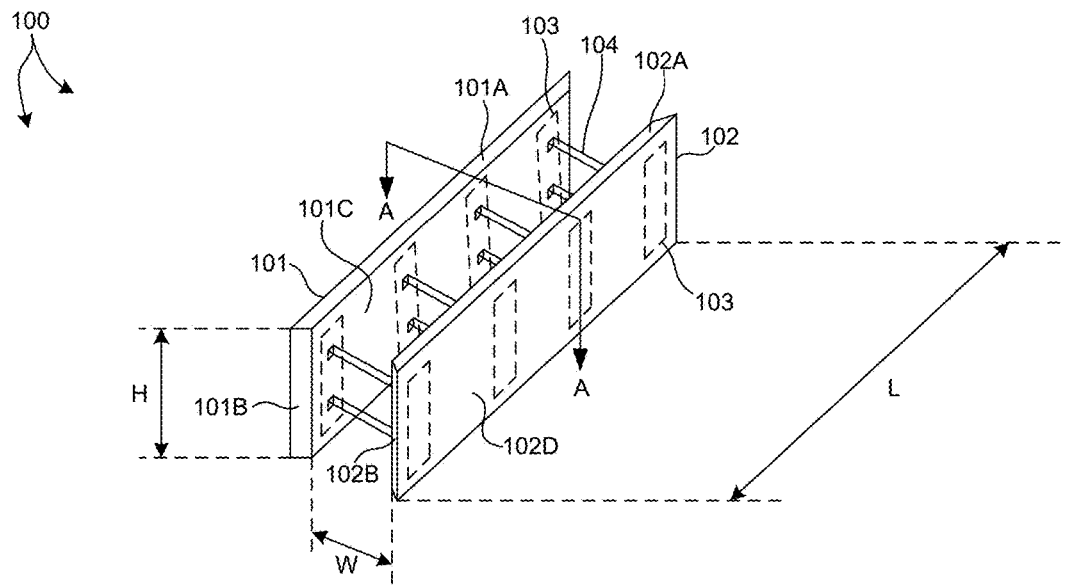
FIG. 1 illustrates an embodiment of a prefabricated, modular, insulating concrete form (ICF) 100 in at least on novel aspect.

FIG. 1 illustrates an embodiment of a prefabricated, modular, insulating concrete form (ICF) 100 in at least on novel aspect.

As depicted in FIG. 1, ICF 100 includes sidewall 101 and sidewall 102. Each sidewall is formed from an insulating foam material. By way of non-limiting example, the insulating foam material may be expanded polystyrene. In general, however, any suitable lightweight, insulating material may be employed to form the sidewalls of ICF 100.

Figure 2:
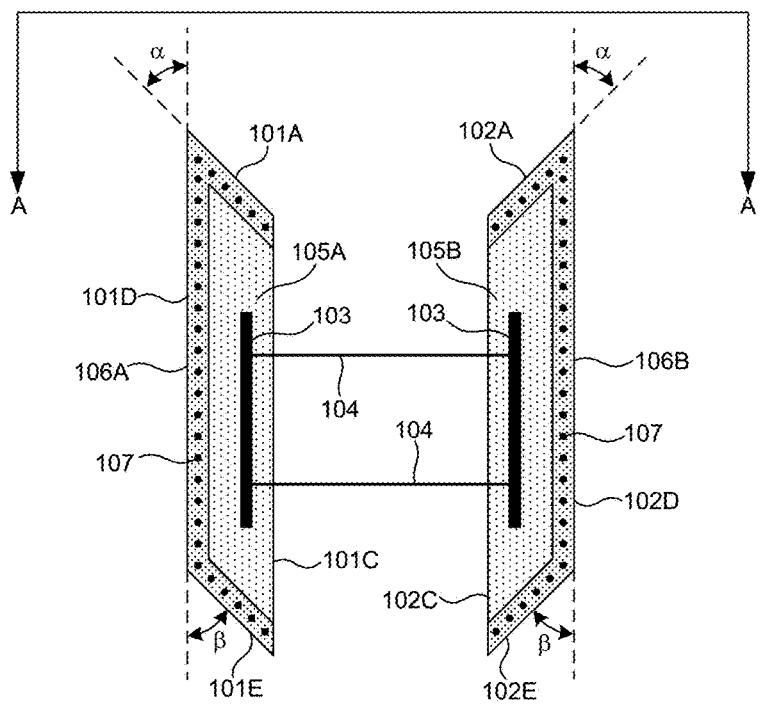
FIG. 2 depicts a cross-sectional view of ICF 100 depicted in FIG. 1 at cross-section A-A.

Each sidewall includes an inward facing surface that faces toward the inside of the ICF 100. The inward facing surface 101C of sidewall 101 and the inward facing surface 102C of sidewall 102 are depicted in FIG. 2 for illustrative purposes. The inward facing surfaces define the cavity between the sidewalls that is subsequently filled with concrete. Each sidewall also includes an outward facing surface that faces away from the ICF 100, opposite the inside facing surface. The outward facing surface 101D of sidewall 101 and the outward facing surface 102D of sidewall 102 are depicted in FIG. 2 for illustrative purposes. The outward facing surfaces of sidewalls 101 and 102 define the surfaces of the wall formed from the ICF 100. In addition, the edge surfaces of each sidewall include top, bottom, front, and rear facing surfaces. The edge surfaces of a particular ICF 100 face the edge surfaces of another ICF 100 arranged end-to-end or top-to-bottom with respect to one another. The top facing surface 101A and the front facing surface 101B of sidewall 101 and the top facing surface 102A and the front facing surface 102B of sidewall 102 are depicted in FIG. 1 for illustrative purposes. Although not visible in FIG. 1, the bottom facing surfaces and back facing surfaces of sidewall 101 and 102 are the surfaces opposite the top facing surfaces and front facing surfaces of sidewall 101 and 102, respectively.

ICF 100 also includes a number of reinforcing plates (e.g., reinforcing plates 103 depicted in FIG. 1) molded into sidewalls 101 and 102 and a number of reinforcing bars (e.g., cross-bars 104 depicted in FIG. 1). The reinforcing bars attach reinforcing plates of sidewall 101 to reinforcing plates of sidewall 102. The system of reinforcing plates and cross-bars provides lateral strength to ICF 100 to prevent a failure of the form structure when concrete is poured into the cavity formed by the ICF forms.

FIG. 2 depicts a cross-sectional view of ICF 100 depicted in FIG. 1 at cross-section A-A. The top facing surfaces 101A and 102A, the bottom facing surfaces 101E and 102E, the inward facing surfaces 101C and 102C, and the outward facing surfaces 101D and 102D of sidewalls 101 and 102, respectively are illustrated in FIG. 2.

In one aspect, a reinforced cement based coating 106A is disposed over at least the top, bottom, and outward facing surfaces of the insulating foam core 105A of sidewall 101. Similarly, a reinforced cement based coating 106B is disposed over at least the top, bottom, and outward facing surfaces of the insulating foam core 105B of sidewall 102. In this manner, the prefabricated, modular, ICF 100 includes a robust, durable coating over the surfaces of the ICF that might be subjected to mechanical abuse during shipping and installation at the job site.

In some embodiments, the reinforced cement based coatings 106A and 106B are the same material. However, in some other embodiments, the reinforced cement based coatings 106A and 106B are different materials. In one embodiment, reinforced cement based coating 106A is a waterproof, reinforced cement based coating that is suitable for application as part of an exterior facing wall of a building, and reinforced cement based coating 106B is a moisture permeable, reinforced cement based coating that is suitable for application as part of an interior facing wall of a building. In this manner, any moisture that might accumulate with a wall constructed from ICF 100 will be able to vent through the interior facing wall of the building, yet the exterior facing wall of the building will remain waterproof.

In some embodiments, the reinforced cement based coating includes a mesh reinforcement material 107 embedded in the cement based coating. For example, a metal or fiberglass mesh material may be embedded in the cement based coating.

By way of non-limiting example, a moisture permeable cement based coating may be a traditional stucco coating, and a waterproof cement based coating may be an Exterior Insulation Finishing System (EIFS) coating available from manufacturers such as Dryvit Systems, Inc., West Warwick, R.I. (USA) or BASF Wall Systems, Jacksonville, Fla. (USA). However, in general, any suitable cement based coating may be contemplated within the scope of this patent document.

In a further aspect, the front and rear facing surfaces of sidewalls 101 and 102 are also coated with the same reinforced cement based material employed to coat sidewalls 101 and 102, respectively.

In another aspect, at least a portion of the top surfaces of the sidewalls are disposed at an angle with respect to the outward facing surfaces. In the embodiment depicted in FIG. 2, top surfaces 101A and 102A of sidewalls 101 and 102, respectively, are sloped inward. In some embodiments, the angle, $\alpha$, is less than sixty degrees. However, in general, any angle may be contemplated within the scope of this patent document. Similarly, at least a portion of the bottom surfaces of the sidewalls are disposed at an angle with respect to the outward facing side surfaces sidewalls such that the sloped portions of the bottom surfaces are parallel to the top surfaces. As depicted in FIG. 2, bottom surfaces 101E and 102E of sidewalls 101 and 102, respectively, are sloped parallel to top surfaces 101A and 102A, respectively. As illustrated, the angle, $\beta$, between the bottom surface and the exterior surface is the same as the angle, $\alpha$. In this manner, copies of ICF 100 stacked on top of one another interlock at the interface of the top and bottom surfaces.

Figure 6:
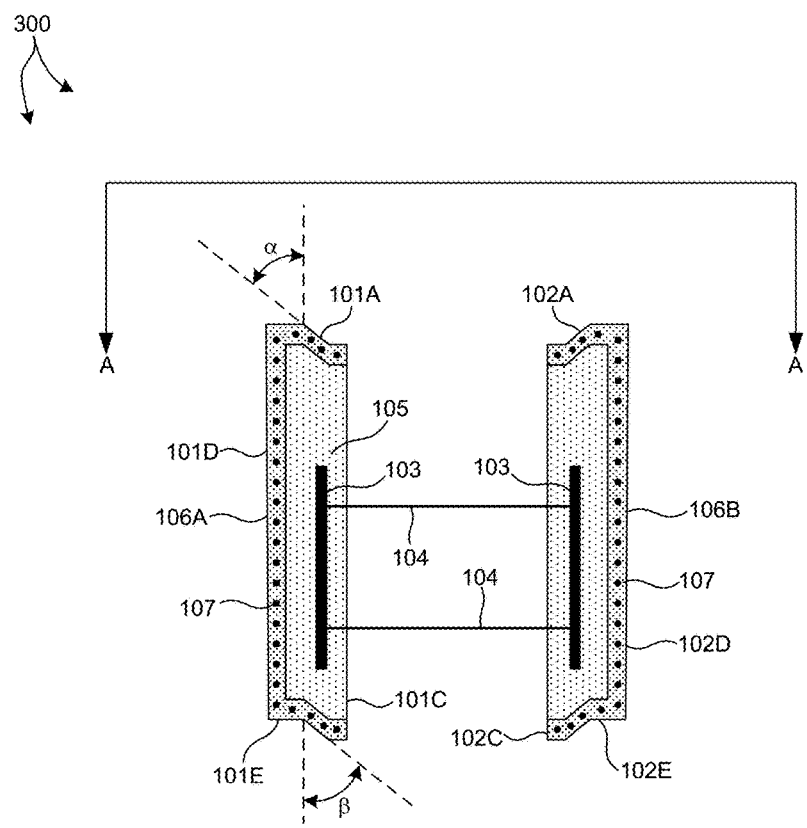
FIG. 6 depicts a cross-sectional view of an ICF 300 in another embodiment.

FIG. 6 depicts a cross-sectional view of an ICF 300 in another embodiment. As described with reference to FIG. 2, at least a portion of the top surfaces of the sidewalls are disposed at an angle with respect to the outward facing surfaces. In the embodiment depicted in FIG. 6, a portion of top surfaces 101A and 102A of sidewalls 101 and 102, respectively, are sloped inward. The remaining portions are disposed at a ninety degree angle with respect to the outward facing surfaces. As described with reference to FIG. 2, in some embodiments, the angle, $\alpha$, is less than sixty degrees. However, in general, any angle may be contemplated within the scope of this patent document. Similarly, at least a portion of the bottom surfaces of the sidewalls are disposed at an angle with respect to the outward facing side surfaces sidewalls such that the sloped portions of the bottom surfaces are parallel to the top surfaces. As depicted in FIG. 6, a portion of bottom surfaces 101E and 102E of sidewalls 101 and 102, respectively, are sloped parallel to top surfaces 101A and 102A, respectively. The remaining portions are disposed at a ninety degree angle with respect to the outward facing surfaces. As illustrated, the angle, β, between the bottom surface and the exterior surface is the same as the angle, α. In this manner, copies of ICF 100 stacked on top of one another interlock at the interface of the top and bottom surfaces.

In some embodiments, a portion of the front and back surfaces of ICF 100 are also tapered at an angle (see FIG. 1) such that copies of ICF 100 stacked on end-to-end interlock at the interface of the front and rear surfaces. However, in some other embodiments, the front and back surfaces of ICF 100 are not tapered (e.g., disposed perpendicular to the exterior faces 101D and 102D of ICF 100).

Figure 3:
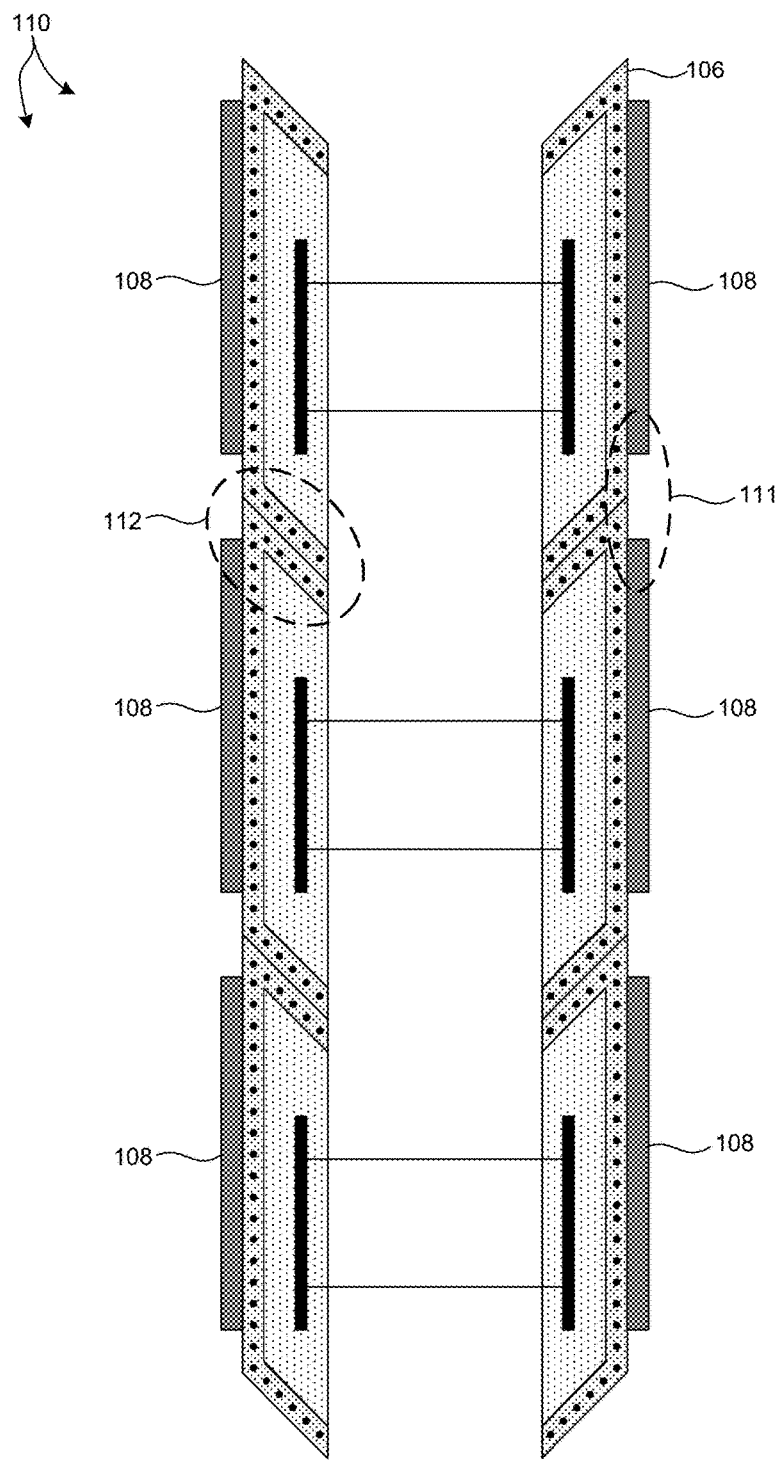
FIG. 3 depicts a cross-sectional view 110 of three copies of ICF 100 stacked on top of one another.

FIG. 3 depicts a cross-sectional view 110 of three copies of ICF 100 stacked on top of one another. As highlighted at reference numeral 112, the top and bottom surfaces of adjacent forms interlock to stabilize the stacked structure.

In a further aspect, the modular, prefabricated ICF 100 includes a cement based finish coating 108 disposed over a portion of the reinforced cement based coating 106A located over an outward facing surface of a sidewall of the ICF form 100. As depicted in FIG. 3, cement based finish coating 108 is applied over the reinforced cement based coating 106A in the factory, prior to shipment to the jobsite. In this manner, a large portion of the finish material is already applied to the wall system before construction, thus minimizing the quantity of material and labor required to finish the wall system on the jobsite. In some embodiments, the cement based finish coating does not extend to the edges of outward facing surface of the sidewall. As highlighted at reference numeral 111, the cement based finish coating 108 applied to the outward facing surface of the ICFs does not extend all the way to the interface between adjacent ICFs. This leaves room for final taping and finishing of the wall after concrete pour with a minimum of material and labor.

Figure 4:
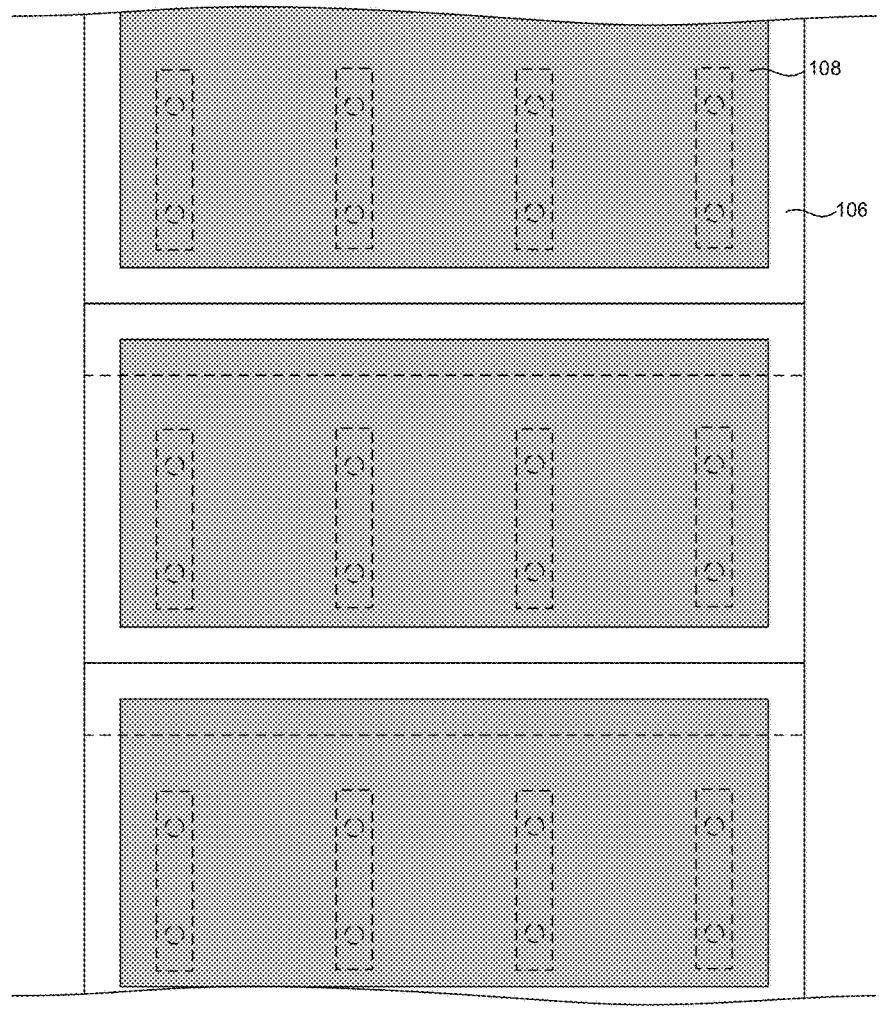
FIG. 4 depicts a side view of three copies of ICF 100 stacked on top of one another.

FIG. 4 depicts a side view of three copies of ICF 100 stacked on top of one another. As depicted in FIG. 4, the cement based finish coating 108 applied to the outward facing surface of the ICFs does not extend all the way to the interface between adjacent ICFs.

ICF 100 is a modular structure, employing standard sizing and novel interlocking features to enable rapid assembly on the jobsite. As depicted in FIG. 1, each ICF 100 has a length, L, width, W, and height, H. In some embodiments, the standard nominal dimensions of ICF 100 include a length of 48 inches, a height of 16 inches, and a width of 6 inches (width of cavity created by ICF 100). However, in general, any standard dimensions may be contemplated within the scope of this patent document.

The prefabricated, modular ICFs are assembled without cement (i.e., dry assembly) on the jobsite. Additional reinforcement may be added (e.g., metal structures attached to the embedded metal plates to prevent lateral failure of the form when concrete is poured into the cavity and to provide additional structural support to the finished wall). After concrete cure, the wall surfaces may be finished by applying taping over the seams and apply finish coatings over areas that are not already pre-finished as described hereinbefore.

Figure 5:
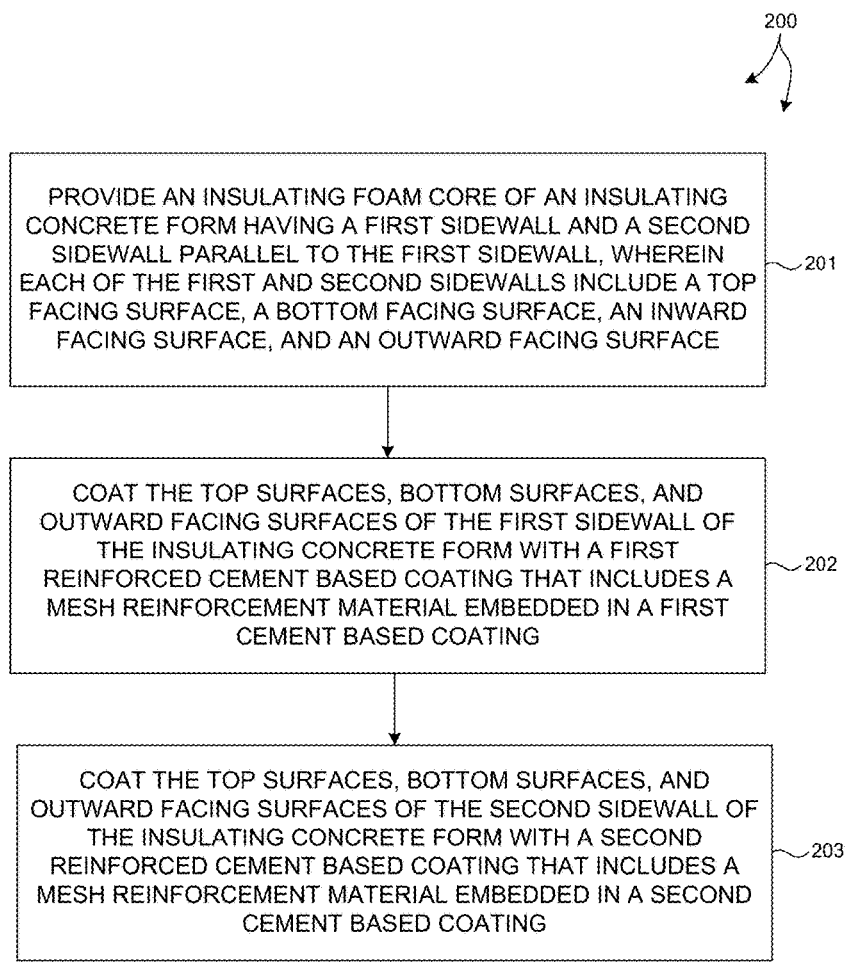
FIG. 5 illustrates a method 200 suitable for producing a prefabricated, modular ICF in accordance with at least one inventive aspect.

FIG. 5 illustrates a method 200 suitable for producing a prefabricated, modular ICF in accordance with at least one inventive aspect.

In block 201, an insulating foam core of an insulating concrete form having a first sidewall and a second sidewall parallel to the first sidewall is provided. Each of the first and second sidewalls include a top facing surface, a bottom facing surface, an inward facing surface, and an outward facing surface.

In block 202, the top surfaces, bottom surfaces, and outward facing surfaces of the first sidewall of the insulating concrete form are coated with a first reinforced cement based coating that includes a mesh reinforcement material embedded in a first cement based coating.

In block 203, the top surfaces, bottom surfaces, and outward facing surfaces of the second sidewall of the insulating concrete form are coated with a second reinforced cement based coating that includes a mesh reinforcement material embedded in a second cement based coating.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A prefabricated, modular, insulating concrete form, comprising:
   an insulating foam core including a first sidewall and a second sidewall parallel to the first sidewall, wherein each of the first and second sidewalls include a top facing surface, a bottom facing surface, an inward facing surface, and an outward facing surface;
   a first reinforced cement based coating disposed over the top surface, bottom surface, and the outward facing surface of the first sidewall; and
   a second reinforced cement based coating disposed over the top surface, bottom surface, and the outward facing surface of the second sidewall.

2. The prefabricated, modular, insulating concrete form of claim 1, wherein the first reinforced cement based coating is waterproof, and wherein the second reinforced cement based coating is permeable to moisture.

3. The prefabricated, modular, insulating concrete form of claim 1, wherein the first reinforced cement based coating and the second reinforced cement based coating are the same material.

4. The prefabricated, modular, insulating concrete form of claim 1, wherein the reinforced cement based coating includes a mesh reinforcement material embedded in a cement based coating.

5. The prefabricated, modular, insulating concrete form of claim 1, further comprising:
   a cement based finish coating disposed over a portion of the reinforced cement based coating located over the outward facing side surface of the first sidewall.

6. The prefabricated, modular, insulating concrete form of claim 5, wherein the portion of the reinforced cement based coating covered by the cement based finish coating does not extend to the edges of outward facing surface of the first sidewall.

7. The prefabricated, modular, insulating concrete form of claim 1, wherein the insulating foam core is expanded polystyrene.

8. The prefabricated, modular, insulating concrete form of claim 1, wherein at least a portion of the top surfaces of the first and second sidewalls are sloped at an angle with respect to the outward facing side surface of the first and second sidewalls.

9. The prefabricated, modular, insulating concrete form of claim 8, wherein at least a portion of the bottom surfaces of the first and second sidewalls are sloped at an angle with respect to the outward facing side surfaces of the first and second sidewalls, respectively, such that the sloped portions of the bottom surfaces of the first and second sidewalls are parallel to the sloped portions of the top surfaces of the first and second sidewalls, respectively.

10. The prefabricated, modular, insulating concrete form of claim 8, wherein the angle is less than sixty degrees.

11. The prefabricated, modular, insulating concrete form of claim 4, wherein the mesh reinforcement material is any of fiberglass and metal.

12. The prefabricated, modular, insulating concrete form of claim 1, further comprising:
   a plurality of reinforcing plates molded into the first and second sidewalls; and
   a plurality of reinforcing bars, wherein each of the plurality of reinforcing bars is attached to a reinforcing plate molded into the first sidewall and a reinforcing plate molded into the second sidewall.

13. A prefabricated, modular, insulating concrete form, comprising:
   an insulating foam core including a first sidewall and a second sidewall parallel to the first sidewall, wherein each of the first and second sidewalls include a top facing surface, a bottom facing surface, an inward facing surface, and an outward facing surface, wherein at least a portion of the top surfaces of the first and second sidewalls are sloped at an angle with respect to the outward facing side surface of the first and second sidewalls; and
   a reinforced cement based coating disposed over the top surface, bottom surface, and the outward facing surface of the first and second sidewalls.

14. The prefabricated, modular, insulating concrete form of claim 13, wherein at least a portion of the bottom surfaces of the first and second sidewalls are sloped at an angle with respect to the outward facing side surfaces of the first and second sidewalls, respectively, such that the sloped portion of the bottom surfaces of the first and second sidewalls are parallel to the sloped portion of the top surfaces of the first and second sidewalls, respectively.

15. The prefabricated, modular, insulating concrete form of claim 13, wherein the reinforced cement based coating includes a mesh reinforcement material embedded in a cement based coating.

16. The prefabricated, modular, insulating concrete form of claim 15, further comprising:
   a cement based finish coating disposed over a portion of the reinforced cement based coating located over the outward facing side surface of the first sidewall.

17. The prefabricated, modular, insulating concrete form of claim 16, wherein the portion of the reinforced cement based coating covered by the cement based finish coating does not extend to the edges of outward facing surface of the first sidewall.

18. The prefabricated, modular, insulating concrete form of claim 13, further comprising:
   a plurality of reinforcing plates molded into the first and second sidewalls; and
   a plurality of reinforcing bars, wherein each of the plurality of reinforcing bars is attached to a reinforcing plate molded into the first sidewall and a reinforcing plate molded into the second sidewall.

19. The prefabricated, modular, insulating concrete form of claim 13, wherein the angle is less than sixty degrees.

20. A method comprising:
   providing an insulating foam core of an insulating concrete form having a first sidewall and a second sidewall parallel to the first sidewall, wherein each of the first and second sidewalls include a top facing surface, a bottom facing surface, an inward facing surface, and an outward facing surface;
   coating the top surfaces, bottom surfaces, and outward facing surfaces of the first sidewall of the insulating concrete form with a first reinforced cement based coating that includes a mesh reinforcement material embedded in a first cement based coating; and
   coating the top surfaces, bottom surfaces, and outward facing surfaces of the second sidewall of the insulating concrete form with a second reinforced cement based coating that includes a mesh reinforcement material embedded in a second cement based coating.

21. The method of claim 20, wherein the first reinforced cement based coating is waterproof, and wherein the second reinforced cement based coating is permeable to moisture.

22. The method of claim 20, wherein the first reinforced cement based coating and the second reinforced cement based coating are the same material.

23. The method of claim 20, further comprising:
   coating a portion of the reinforced cement based coating located over the outward facing side surface of the first sidewall with a cement based finish coating, wherein the portion of the reinforced cement based coating covered by the cement based finish coating does not extend to the edges of outward facing surface of the first sidewall.

24. The method of claim 20, wherein at least a portion of the top surfaces of the first and second sidewalls are sloped at an angle with respect to the outward facing side surface of the first and second sidewalls, respectively, and wherein at least a portion of the bottom surfaces of the first and second sidewalls are sloped at an angle with respect to the outward facing side surfaces of the first and second sidewalls, respectively, such that the sloped portion of bottom surfaces of the first and second sidewalls are parallel to the sloped portion of the top surfaces of the first and second sidewalls, respectively.

* * * * *